United States Patent [19]
Nagasaka

[11] Patent Number: 5,409,293
[45] Date of Patent: Apr. 25, 1995

[54] VEHICLE SEAT INCLUDING A CHILD SEAT
[75] Inventor: Chikao Nagasaka, Aichi, Japan
[73] Assignee: Kabushiki Kaisha Tokai-Rika-Denki Seisakusho, Aichi, Japan
[21] Appl. No.: 25,233
[22] Filed: Mar. 2, 1993
[30] Foreign Application Priority Data
  Mar. 5, 1992 [JP] Japan .................. 4-11161 U
[51] Int. Cl.6 .................................. B60N 2/12
[52] U.S. Cl. ...................... 297/236; 297/105
[58] Field of Search ............ 297/236, 237, 378.1, 297/250.1, 105

[56] References Cited
U.S. PATENT DOCUMENTS
4,518,201  5/1985  Wahlmann ............. 297/378.1
5,121,964  6/1992  Fourrey ............... 297/236 X FOREIGN PATENT DOCUMENTS
182623    7/1955  Australia ............. 297/236
0516495  12/1992  European Pat. Off. ... 297/237
3800896   9/1988  Germany .............. 297/237
6082637   7/1981  Japan ................ 297/378.1
0076435   4/1985  Japan ................ 297/378.1
1-18424   5/1989  Japan .
2-23229   2/1990  Japan .
2-39875  10/1990  Japan .
2099691  12/1982  United Kingdom ...... 297/378.1

Primary Examiner—Peter R. Brown
Assistant Examiner—David E. Allred
Attorney, Agent, or Firm—Fisher & Associates

[57] ABSTRACT

A vehicle seat having an occupant seat and a child seat, and being changeable as occasion demands between a state of use as the occupant seat and a state of use as the child seat. The occupant seat has a first seat cushion and a first seat back. The first seat cushion is foldable so that the first seat cushion and the first seat back are superposed. The child seat is comprised of a second seat cushion and a second seat back, and is built in a reverse surface of the first seat cushion. A front end portion of the first seat cushion is axially supported to a vehicle by a supporting device. By rotating the first seat cushion, the first seat cushion is upright and the first seat cushion and the first seat back are superposed. Further, when the vehicle seat is in the state of use as the occupant seat, the child seat is accommodated under the reverse surface of the first seat cushion which faces toward a bottom of the vehicle.

21 Claims, 5 Drawing Sheets

VEHICLE SEAT INCLUDING A CHILD SEAT

BACKGROUND OF THE INVENTION

1. Field of the Invention

The present invention relates to a vehicle seat in which a child seat is built into an occupant seat formed by a seat cushion and a seat back which is reclinable with respect to the seat cushion.

2. Description of the Related Art

There are various types of conventional child seats. For example, there is a type in which the child seat is fixed to an ordinary occupant seat as a single unit. There is another type in which a child seat mounting/fixing member is built in an occupant seat so that the child seat is fixed to the occupant seat as a single unit. In yet another type, which will be referred to hereinafter as a "built-in type", a child seat is built in an occupant seat so that the vehicle seat can be changed between a state of use as an occupant seat and a state of use as a child seat as occasion demands.

With built-in type vehicle seats, there is no need to remove the child seat. Built-in type vehicle seats are therefore superior in that the only work involved therein is changing the seat from one state of use to the other (as an example, see Japanese Utility Model Application Laid-Open No. 2-23229).

The structure disclosed in the above-mentioned reference is as follows: in an ordinary occupant seat, a seat back and a connecting rod are swingable a predetermined amount with respect to a seat cushion. Vertical grooves are formed in a reverse surface of the seat back. A child restraining belt and a waist portion pad are accommodated in the vertical grooves. Accordingly, when the occupant seat is to be used, the vehicle seat is placed in its normal state. When the child seat is to be used, the seat back of the occupant seat is swung so that by using the seat cushion of the occupant seat as the seat cushion of the child seat as well, a child can sit facing the rear.

However, in such a structure, the seat cushion of the occupant seat is used also as the child seat. Therefore, a drawback arises in that the angles of the seat surface are not structured so as to allow an optimal seat surface for a child. Further, in order to protect the sides of the child's body, it is necessary to form side wall portions. However, such side wall portions are unnecessary in an occupant seat. Namely, separate, independent cushion capabilities for an occupant seat and a child seat cannot be ensured.

SUMMARY OF THE INVENTION

With the aforementioned in view, an object of the present invention is to provide a vehicle seat in which a child seat is built into an occupant seat and in which separate, independent cushion capabilities can be ensured for the occupant seat and the child seat, respectively.

In accordance with an aspect of the present invention, there is a vehicle seat comprising: an occupant seat having a first seat cushion and a first seat back which is foldable such that the first seat cushion and the first seat back are superposed; and a child seat having a second seat cushion and a second seat back; wherein the child seat is built into the occupant seat, the vehicle seat being changeable as occasion demands between a state of use as the child seat and a state of use as the occupant seat, a front end portion of the first seat cushion being axially supported to a vehicle via a supporting means, the first seat cushion being rotated so as to be upright and so that the first seat cushion and the first seat back are superposed, the child seat being accommodated under a reverse surface of the first seat cushion, the reverse surface facing toward a bottom of the vehicle when the vehicle seat is in the state of use as the occupant seat.

Further, in accordance with another aspect of the present invention, there is a vehicle seat in which a child seat is built into an occupant seat, the vehicle seat being changeable as occasion demands between a state of use as the child seat and a state of use as the occupant seat, comprising: the occupant seat having a first seat cushion and a first seat back which is foldable such that the first seat cushion and the first seat back are substantially superposed; the child seat having a second seat cushion and a second seat back; first supporting means axially supporting a front end portion of the first seat cushion such that an axial direction is a transverse direction of a vehicle; a first frame in which the child seat is built, the first frame being disposed at a real end surface of the first seat cushion, and the first frame supporting a rear end portion of the first cushion when the vehicle seat is in the state of use as the occupant seat; a pair of arms extending integrally from the first frame toward the first seat back; supporting shafts provided at the pair of arms and axially supporting a lower end portion of the first seat back; and a pair of second frames in which the first supporting means is received, the pair of second frames respectively axially supporting both sides of a front end portion of the first frame; wherein when the vehicle seat is in the state of use as the occupant seat, the child seat is accommodated under a reverse surface of the first seat cushion which faces toward a bottom of the vehicle, and when the vehicle seat is changed from the state of use as the occupant seat to the state of use as the child seat, the first seat back is reversed around the supporting shafts with respect to the first seat cushion such that the first seat back and the first seat cushion are substantially superposed, and in this state, the first seat cushion is rotated around the first supporting means toward a front of the vehicle so that the first seat cushion is upright.

Moreover, in accordance with another aspect of the present invention, there is a vehicle seat in which a child seat is attachable to and removable from an occupant seat, comprising: the occupant seat having a first seat cushion and a finest seat back which is foldable such that the first seat cushion and the first seat back are superposed; and engaging means for engaging the child seat to a reverse side of the first seat cushion such that the child seat is attachable and removable; wherein when the vehicle seat is changed from a state of use as the occupant seat to a state of use as the child seat, a front end portion of the first seat cushion is axially supported to a vehicle by a supporting member, the first seat back being rotated so as to be upright and so that the first seat back and the first seat cushion are superposed.

DESCRIPTION OF THE PREFERRED EMBODIMENTS

A vehicle seat 10 relating to an embodiment of the present invention will be described hereinafter with reference to FIGS. 1 through 4.

Figure 2:
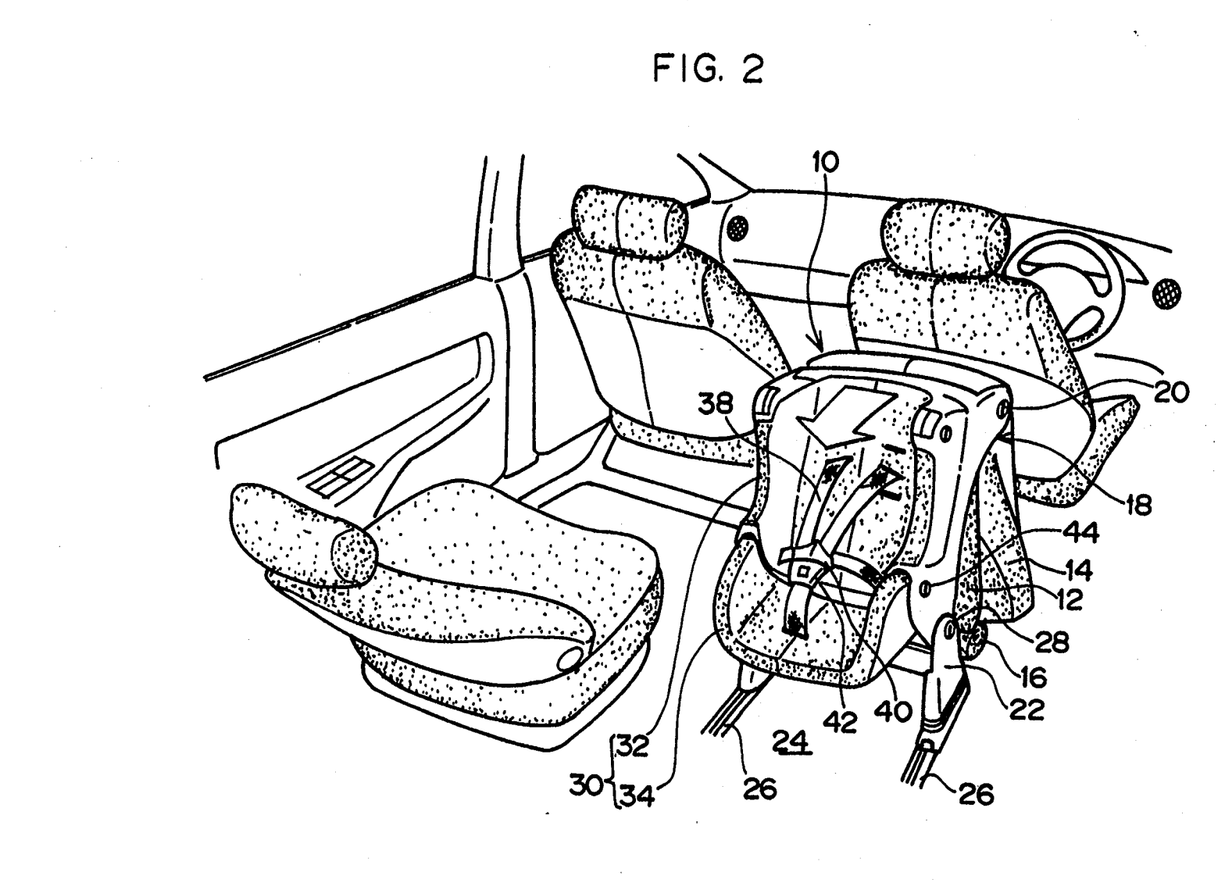
FIG. 2 is a perspective view illustrating the interior of a one-box vehicle equipped with the vehicle seat shown in FIG. 1.

FIG. 2 is a perspective view illustrating the interior of a so-called one-box vehicle provided with the vehicle seat 10. In this drawing, the vehicle seat 10 is shown in a state of being used as a child seat, which will be described hereinafter.

Figure 1:
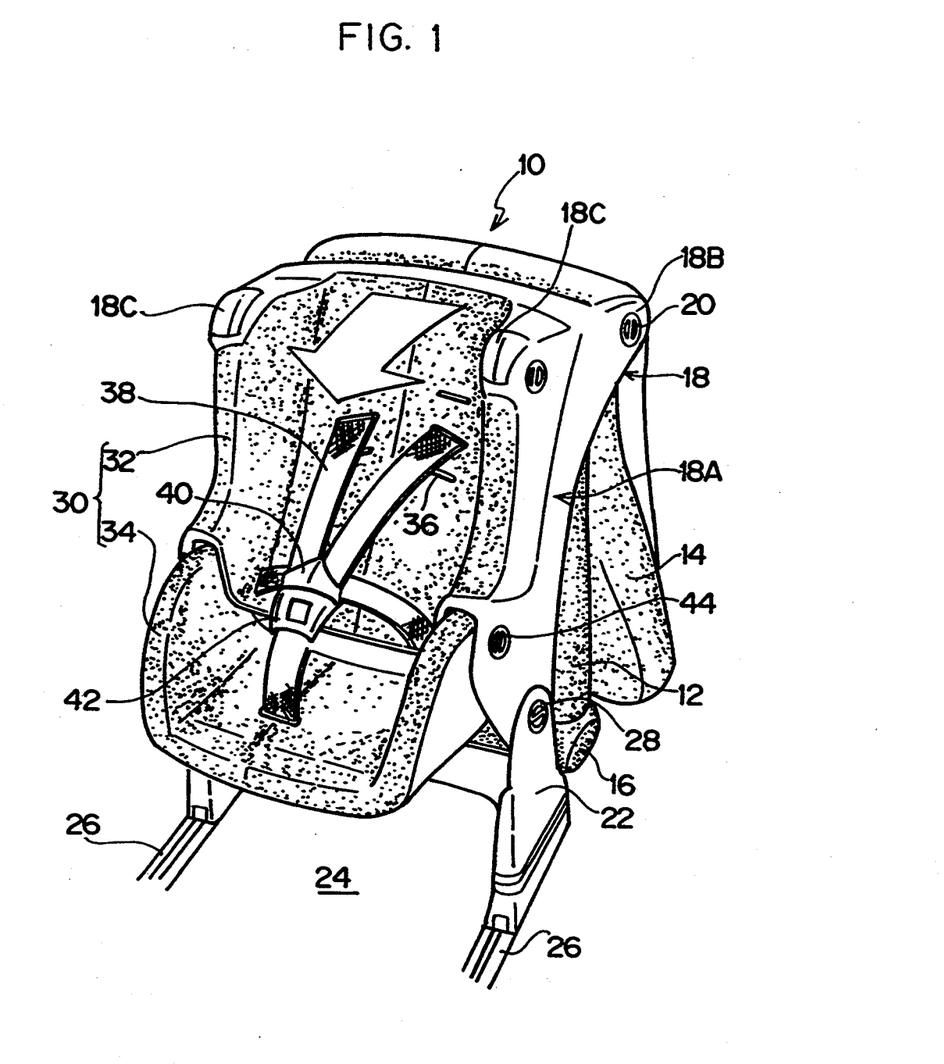
FIG. 1 is a perspective view illustrating use of a vehicle seat relating to the present embodiment as a child seat.
Figure 3:
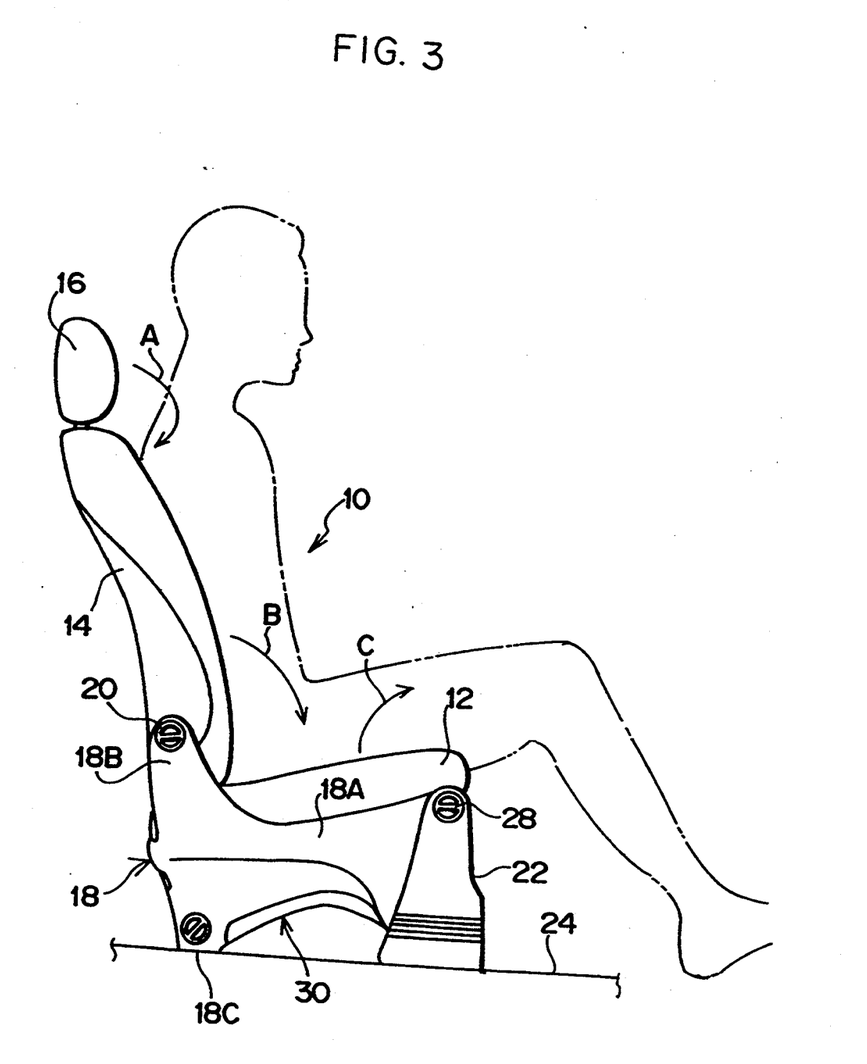
FIG. 3 is a side view illustrating a case in which the vehicle seat shown in FIG. 1 is used as an occupant seat.

As illustrated in FIGS. 1 and 2, the vehicle seat 10 is equipped with a seat cushion 12 and a seat back 14, which is reclinable with respect to the seat cushion 12 by an unillustrated reclining mechanism. A head rest 16 is mounted at a lower end portion of the seat back 14 so as to be reclinable with respect to the seat back 14. (Note that "lower end portion" as used here corresponds to an upper end portion of the vehicle seat 10 when the vehicle seat 10 is used as an occupant seat, as is illustrated in FIG. 3. Hereinafter, expressions regarding position in the description of FIGS. 1 and 2 given in the specification will be based on the positional relationships illustrated in FIGS. 1 and 2.)

The seat cushion 12 includes a frame-shaped supporting frame 18 at the rear end surface thereof. The supporting frame 18 functions as a seat cushion frame when the vehicle seat 10 is used as an occupant seat.

The supporting frame 18 includes a frame-shaped base portion 18A disposed at the reverse surface side of the seat cushion 12. A pair of arm portions 18B is provided integrally with the base portion 18A so as to extend from the upper end portions of the base portion 18A toward the seat back 14 side. The upper end portion (being a base end) of the seat back 14 is axially supported at the pair of arm portions 18B by respective supporting shafts 20. The pair of supporting shafts 20 is coaxially connected to each other by an unillustrated connecting rod. The seat back 14 is reclinable around the supporting shafts 20 by an unillustrated reclining mechanism.

Further, a pair of lower frames 22 are axially supported respectively at lower end portions of the base portion 18A of the supporting frame 18. Accordingly, the seat cushion 12 is pivotable around supporting shafts 28 of the respective upper end portions of the pair of lower frames 22. The lower end portion of the lower frame 22 is slidably supported by a seat track 26 disposed on a floor 24 of the vehicle body.

A child seat 30 is integrally built in a surface, towards the rear side of the vehicle, of the base portion 18A of the supporting frame 18. The child seat 30 is formed by child seat back 32 and child seat cushion 34. The child seat cushion 34 is optimally suited for a child's physique, and its characteristics are therefore different from those of the seat cushion 12 on which an adult sits. As shown in FIG. 1, webbing through-holes 36 are formed in the child seat back 32 at a plurality of levels. A pair of restraining belts 38, which are used to restrain a child, hang down from predetermined webbing through-holes 36. Respective end portions of the pair of restraining belts 38 are connected by a waist pad 40. By engaging an unillustrated tongue plate, which is provided at an end of the waist pad 40, and a buckle device 42, which is provided in the child seat cushion 34, the webbing can be applied to a child.

The child seat cushion 34 and the child seat back 32 are connected by supporting shafts 44 disposed at a rear side of a lower end of the supporting frame 18. As a result, the child seat cushion 34 is pivotable around the supporting shafts 44. Accordingly, when the occupant seat is to be used, as in the state illustrated in FIG. 3, the child seat cushion 34 is pivoted so that it is stored within the child seat back 32.

Lock portions 18C are formed at a rear side of an upper end portion of the supporting frame 18. When the occupant seat is being used, the lock portions 18C can engage respectively with the seat tracks 26.

Next, operation of the present embodiment will be described.

FIG. 3 illustrates a state in which the vehicle seat 10 is being used as an occupant seat. Namely, the seat cushion 12 is substantially horizontal, and the seat back 14 is standing substantially upright with respect to the seat cushion 12. An adult (represented by the two-dot chopin line in FIG. 3) can therefore sit in the vehicle seat 10. In this state, the lock portions 18C of the supporting frame 18 are engaged with the seat tracks 26. The child seat 30 is stored under the reverse surface of the seat cushion 12.

Figure 4:
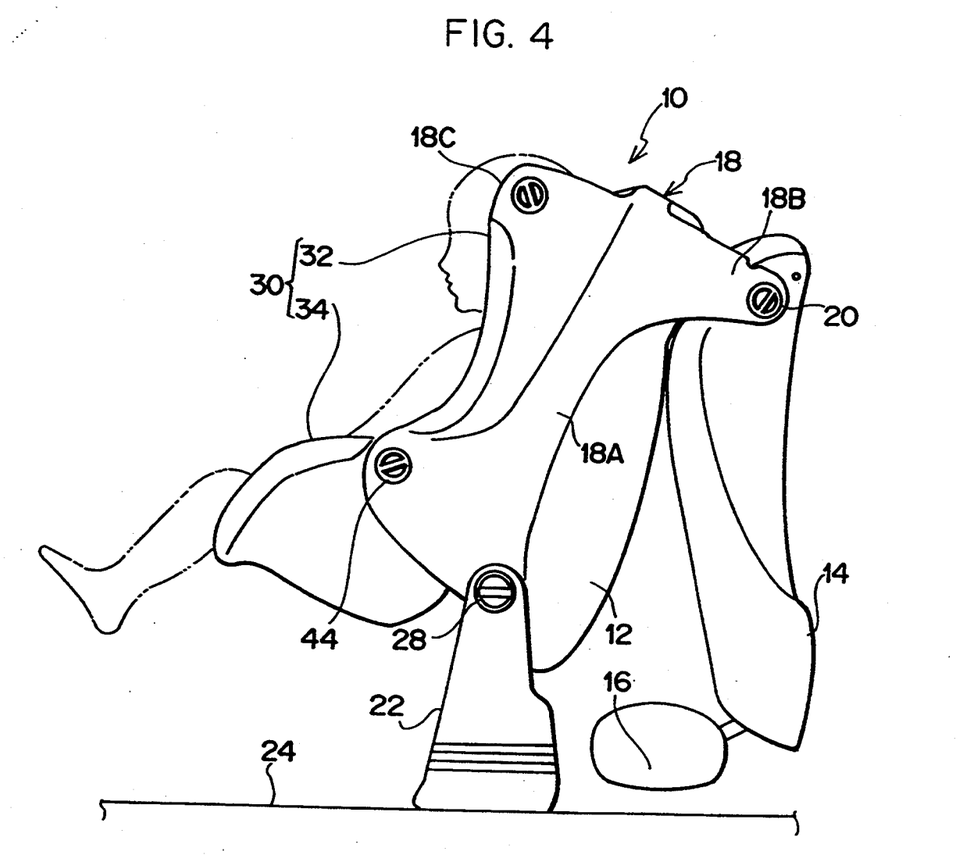
FIG. 4 is a side view illustrating the seat shown in FIG. 3 transformed for use as a child seat.

When the vehicle seat 10 is to be used as a child seat, the vehicle seat 10 is changed from the state illustrated in FIG. 3 to that illustrated in FIG. 4. Namely, the head rest 16 is reclined toward the front of the vehicle (in the direction of arrow A in FIG. 3), and the seat back 14 is folded, with respect to the seat cushion 12, toward the front of the vehicle (in the direction of arrow B in FIG. 3) around the supporting shafts 20. In this way, the seat back 14 lies on top of the seat cushion 12. After the engaged state of the lock portions 18C of the supporting frame 18 and the seat tracks 26 has been canceled, the rear end portion of the seat cushion 12 is pivoted toward the front of the vehicle (in the direction of arrow C in FIG. 3) around the supporting shafts 28 and is fixed by an unillustrated lock mechanism. In this way, the seat cushion 12 and the seat back 14 are upright with respect to vehicle floor 24. Namely, the vehicle seat 10 is moved from the state shown in FIG. 3 to that shown in FIG. 4 such that the child seat 30 is positioned at the reverse surface (the surface toward the rear of the vehicle) of the seat cushion 12 which is upright. Accordingly, a child (represented by the two-dot chain line in FIG. 4) can sit in the vehicle seat 10. After a child has been placed in the vehicle seat 10, the restraining belts 38 are applied to the chili:l, and the tongue plate of the waist pad 40 is engaged with the buckle device 42. Accordingly, the child is restrained by the webbing.

When the vehicle seat 10 is to be used as an occupant seat for adults, the above-described operations are carried out in reverse.

In the present embodiment, the child seat 30, which is formed of the child seat cushion 34 and the child seat back 32, is disposed at the reverse surface of the seat cushion 12 of the vehicle seat 10. By pivoting the vehicle seat 10 appropriately, the vehicle seat 10 can be used as an occupant seat or as a child seat. Therefore, separate, independent cushion capabilities can be ensured for both an occupant seat and a child seat. Accordingly, seating; comfort of both adults and children can be improved.

Further, when the vehicle seat 10 is used as a child seat, the child seat 30 is located at the reverse surface of the seat cushion 12, and the child is seated facing the rear of the vehicle. Therefore, when the vehicle suddenly decelerates, inertial force applied to the child can be supported not only by the seat back 32 of the child seat 30, but also by the seat cushion 12 of the occupant seat. Accordingly, the safety of the child riding in the vehicle can be improved.

In the present embodiment, when the vehicle seat 10 is converted from its state of use as an occupant seat to its state of use as a child seat and vice versa, the connecting position of the supporting shafts 20 (connecting rod), which reclinably connect the seat back 14 and the seat cushion 12, relative to the seat cushion 12 is constantly and uniformly maintained. Therefore, the strength of the vehicle seat 10 can be ensured. Namely, the prior art (Japanese Utility Model Application Laid-Open No. 2-23229) is structured such that the connecting rod itself swings with respect to the seat cushion 12. In this structure, it is difficult to ensure the strength of the vehicle seat. This drawback is eliminated in the present embodiment.

Moreover, in the vehicle seat 10 of the present embodiment, the child seat 30 is stored at the reverse surface of the seat cushion 12, i.e., at the surface facing the bottom of the vehicle when the vehicle seat 10 is used as the occupant seat. Therefore, storage of the child seat 30 is facilitated, which contributes to effective utilization of the interior space of the vehicle.

In the present embodiment, the child seat 30 is built in the rear surface of the seat cushion 12 and cannot be detached therefrom. However, the present invention is not limited to the same, and a structure may be provided in which the child seat 30 is detachable from the reverse surface of the seat cushion 12.

Figure 5:
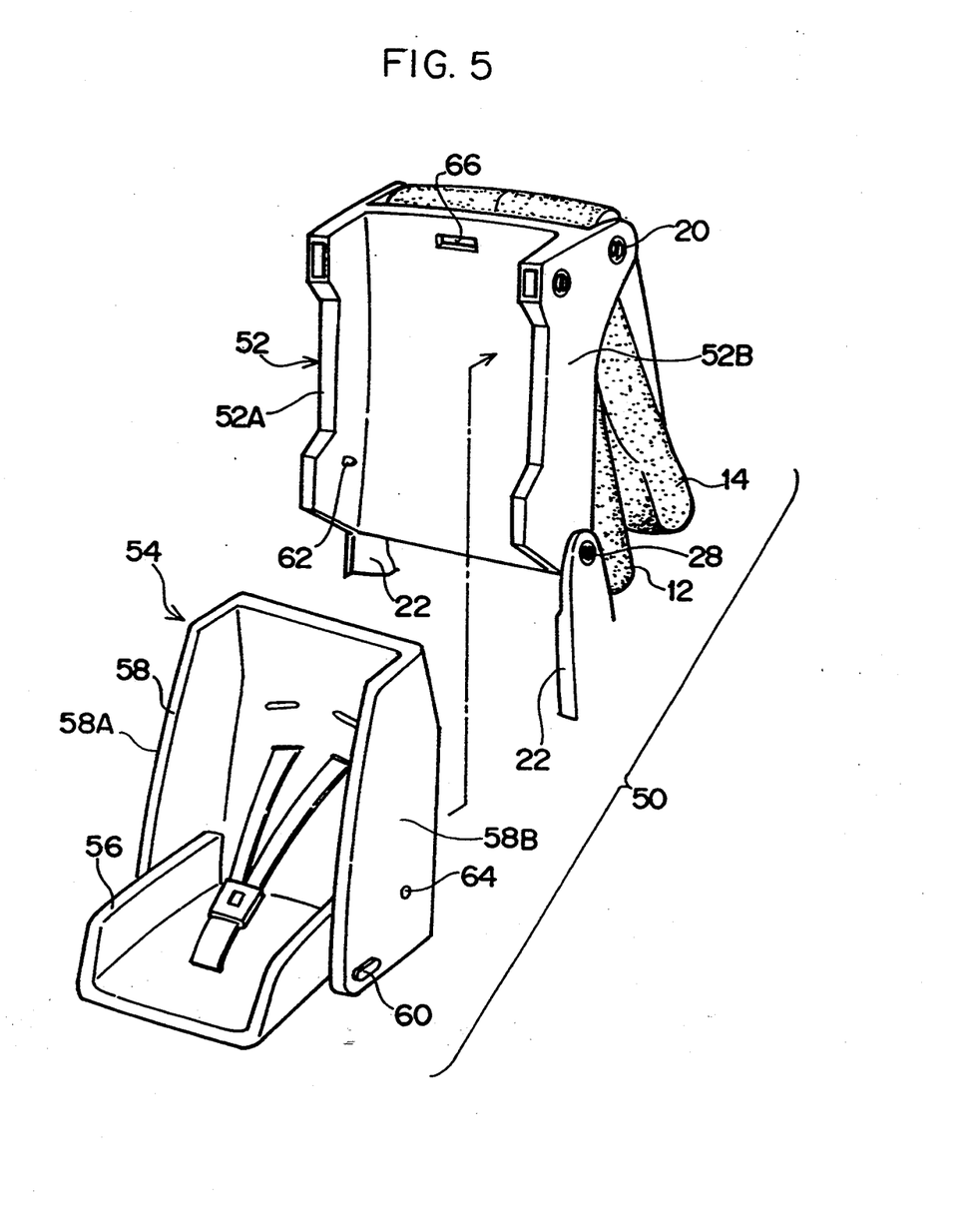
FIG. 5 is an exploded perspective view illustrating a variation of the vehicle seat shown in FIG. 1.

For example, as illustrated in FIG. 5, in a vehicle seat 50, a supporting frame 52, which is similar to the previously-described supporting frame 18, is attached to the reverse surface of the seat cushion 12. A child seat 54, which is provided separately from the supporting frame 52, is detachable therefrom. The child seat 54 is equipped with a child seat cushion 56 and a child seat back 58. The child seat cushion 56 is axially supported so as to be pivotable with respect to the child seat back 58. An operation button 60 is disposed on a side surface of the child seat back 58. By operating the operation button 60, the engagement of engaging pins 62, which are formed on respective inner sides of side portions 52A, 52B of the supporting frame 52 and which are urged by springs, and engaging holes 64, which are formed on respective side portions 58A, 58B of the child seat back 58, can be canceled. Any of a variety of engagement canceling mechanisms can be applied to the present variation. For example, an electric mechanism can be used in which, by pressing the operation button 60, a circuit is closed so that pushers, which are inserted within the engagement holes 64, are extended. The pushers push the engagement pins 62 so that engagement of the engagement pins 62 and the engagement holes 64 is canceled. Further, an unillustrated fitting projection, which is formed on an upper portion of a back surface of the child seat back 58, is fit into a rectangular hole 66, which is formed in an upper portion of the surface facing the rear of the vehicle of the supporting frame 52.

When the above-described child seat 54 is used, various child seats can be attached thereto in accordance with the age (physique) of the child. The interchangeability and economy of this structure are therefore excellent. Further, when the child seat 54 is not being used, it can be removed and set aside. Therefore, the entire weight of the vehicle can be reduced.

As described above, the vehicle seat related to the present invention has an excellent effect in that, in a vehicle seat in which a child seat is built into an occupant seat, separate, independent cushion capabilities can be ensured for both an occupant seat and a child seat, respectively.

What is claimed is:

1. A vehicle seat comprising:
an occupant seat having a first seat cushion and a first seat back which is foldable such that said first seat cushion and said first seat back are superposed; and
a child seat having a second seat cushion and a second seat back;
said child seat being built into said occupant seat, said vehicle seat being changeable between a state of use as said child seat and a state of use as said occupant seat, a front end portion of said first seat cushion being pivotally supported to a vehicle via a supporting means, a base end of said first seat back being pivotally supported in relation to a rear end portion of said first seat cushion, said first seat cushion being rotated so as to be upright and so that said first seat cushion and said first seat back are superposed, said child seat being accommodated under said first seat cushion of said occupant seat when said occupant seat of said vehicle seat is in the state of use.

2. A vehicle seat according to claim 1, wherein the front end portion of said first seat cushion is axially supported to the vehicle such that a transverse direction of the vehicle is an axial direction.

3. A vehicle seat according to claim 1, wherein a sitting direction of said child seat is a direction opposite a sitting direction of said occupant seat, and said second seat back is located at said reverse surface of said first scat cushion.

4. A vehicle seat according to claim 1, wherein said supporting means maintains said first seat cushion and includes a first frame which maintains said second seat back.

5. A vehicle seat according to claim 4, wherein said supporting means rotatably supports said first frame such that said first seat cushion is upright, and said supporting means has a second frame maintained by the vehicle.

6. A vehicle seat according to claim 5, wherein said second frame is movable with respect to the vehicle.

7. A vehicle seat according to claim 6, wherein said second seat cushion is maintained by said second seat back so as to be accommodatable at said second seat back.

8. A vehicle seat according to claim 7, wherein a portion of said first frame includes a supporting portion which supports said occupant seat to the vehicle when said vehicle seat is in the state of use as said occupant seat.

9. A vehicle seat in which a child seat is built into an occupant seat, said vehicle seat being changeable between a state of use as said child seat and a state of use as said occupant seat, comprising:
said occupant seat having a first seat cushion and a first seat back which is foldable such that said first seat cushion and said first seat back are substantially superposed;

said child seat having a second seat cushion and a second seat back;

first supporting means for axially supporting a front end portion of said first seat cushion such that an axial direction is a transverse direction of a vehicle;

a first frame in which said child seat is built, said first frame being disposed at a rear end surface of said first seat cushion, and said first frame supporting a rear end portion of said first cushion when said vehicle seat is in the state of use as said occupant seat;

a pair of arms extending integrally from said first frame toward said first seat back;

supporting shafts provided at said pair of arms and axially supporting a lower end portion of said seat back; and a pair of second frames in which said first supporting means is received, said pair of second frames respectively axially supporting both sides of a front end portion of said first frame;

wherein when said vehicle seat is in the state of use as said occupant seat, said child seat is accommodated under said first seat cushion which faces toward a bottom of the vehicle, and when said vehicle seat is changed from the state of use as said occupant seat to the state of use as said child seat, said first seat back is rotated about said supporting shafts toward said first seat cushion such that said first seat back and said first seat cushion are substantially folded and superposed, and in this state, said first seat cushion is rotated together with said first seat back about an axis toward a front of the vehicle so that said first seat cushion is upright.

10. A vehicle seat according to claim 9, wherein a sitting direction of said child seat is a direction opposite a sitting direction of said occupant seat, and said second seat back is located at said reverse surface of said first seat cushion.

11. A vehicle seat according to claim 9, comprising:
said second seat back in which a cavity is provided, said second seat cushion being accommodatable in said cavity; and a connecting rod provided at said first frame and connecting said second seat cushion and said second seat back;

wherein when said child seat is accommodated in said cavity of said first seat cushion, said second seat cushion is rotated around said connecting rod so as to be accommodated in said cavity.

12. A vehicle seat according to claim 9, comprising:
motion permitting means provided on a floor of the vehicle, and when said vehicle seat is changed from the state of use as said occupant seat to the state of use as said child seat, said motion permitting means movably supports said pair of second frames so that a seat position of said vehicle seat is adjustable.

13. A vehicle seat according to claim 9, comprising:
motion permitting means provided on a floor of the vehicle and movable supporting said pair of second frames; and lock means provided at said first frame and locking said first frame to said motion permitting means when said vehicle seat is in the state of use as said occupant seat;

wherein when said vehicle seat is in the state of use as said occupant seat, a seat position of said vehicle seat is fixed, and when said vehicle seat is changed from the state of use as said occupant seat to the state of use as said child seat, the seat position is movable with respect to the vehicle.

14. A vehicle seat according to claim 9, comprising:
said second seat back having a cavity provided therein, said second seat cushion being accommodatable in said cavity, a sitting direction of said child seat being in a direction opposite a sitting direction of said occupant seat; and a connecting rod provided at said first frame and connecting said second seat cushion and said second seat back.

15. A vehicle seat according to claim 9, comprising:
said child seat whose siring direction is a direction opposite of a sitting direction of said occupant seat; and motion permitting means provided on a floor of the vehicle and movably supporting said pair of second frames.

16. A vehicle seat according to claim 9, comprising:
said child seat whose sitting direction is a direction opposite a sitting direction of said occupant seat;

motion permitting means provided on a floor of the vehicle and movably supporting said pair of second frames; and 17. A vehicle seat according to claim 9, comprising:
said second seat back in which a cavity is provided, said second seat cushion being accommodatable in said cavity;

motion permitting means provided on a floor of the vehicle and movably supporting said pair of second frames; and a connecting shaft provided at said first frame and connecting said second seat cushion and said second seat back.

18. A vehicle seat according to claim 9, comprising:
said second seat back in which a cavity is provided, said second seat cushion being accommodatable in said cavity;

motion permitting means provided on a floor of the vehicle and movably supporting said pair of second frames;

a connecting rod provided at said first frame and connecting said second seat cushion and said second seat back; and lock means provided at said first frame and locking said first frame to said motion permitting means when said vehicle seat is in the state of use as said occupant seat.

19. A vehicle seat according to claim 9, comprising:
said child seat having said second seat back in which a cavity is provided, said second seat cushion being accommodatable in said cavity, a siring direction of said child seat being a direction opposite a sitting direction of said occupant seat;

motion permitting means provided on a floor of the vehicle and movably supporting said pair of second frames; and a connecting rod provided at said first frame and connecting said second seat cushion and said second seat back.

20. A vehicle seat according to claim 9, comprising:
said child seat having said second seat back in which a cavity is provided, said second seat cushion being accommodatable in said cavity, a sitting direction of said child seat being a direction opposite a sitting direction of said occupant seat;

motion permitting means provided on a floor of the vehicle and movably supporting said pair of second frames;

lock means provided at said first frame and locking said first frame to said motion permitting means when said vehicle seat is in the state of use as said occupant seat; and a connecting shaft provided at said first frame and connecting said second seat cushion and said second seat back.

21. A vehicle seat in which a child seat is attachable to and removable from an occupant seat, comprising:

said occupant seat having a first seat cushion and a first seat back which is foldable such that said first seat cushion and said first seat back are superposed, and engaging means for engaging said child seat to a reverse side of said first seat cushion such that said child seat is attachable and removable;

wherein a front end portion of said first seat cushion is pivotally supported to a vehicle by a supporting member, a base end of said first seat back being pivotally supported in relation to a rear end portion of said first seat cushion, said first seat back being rotated so as to be upright and so that said first seat back and said first seat cushion are superposed when said vehicle seat is being changed from a state of use as said occupant seat to a state of use as said child seat and said child seat being accommodated under said first seat cushion of said occupant seat when said occupant of said vehicle seat is unfolded in the state of use.

* * * * *